United States Patent Office 3,057,840
Patented Oct. 9, 1962

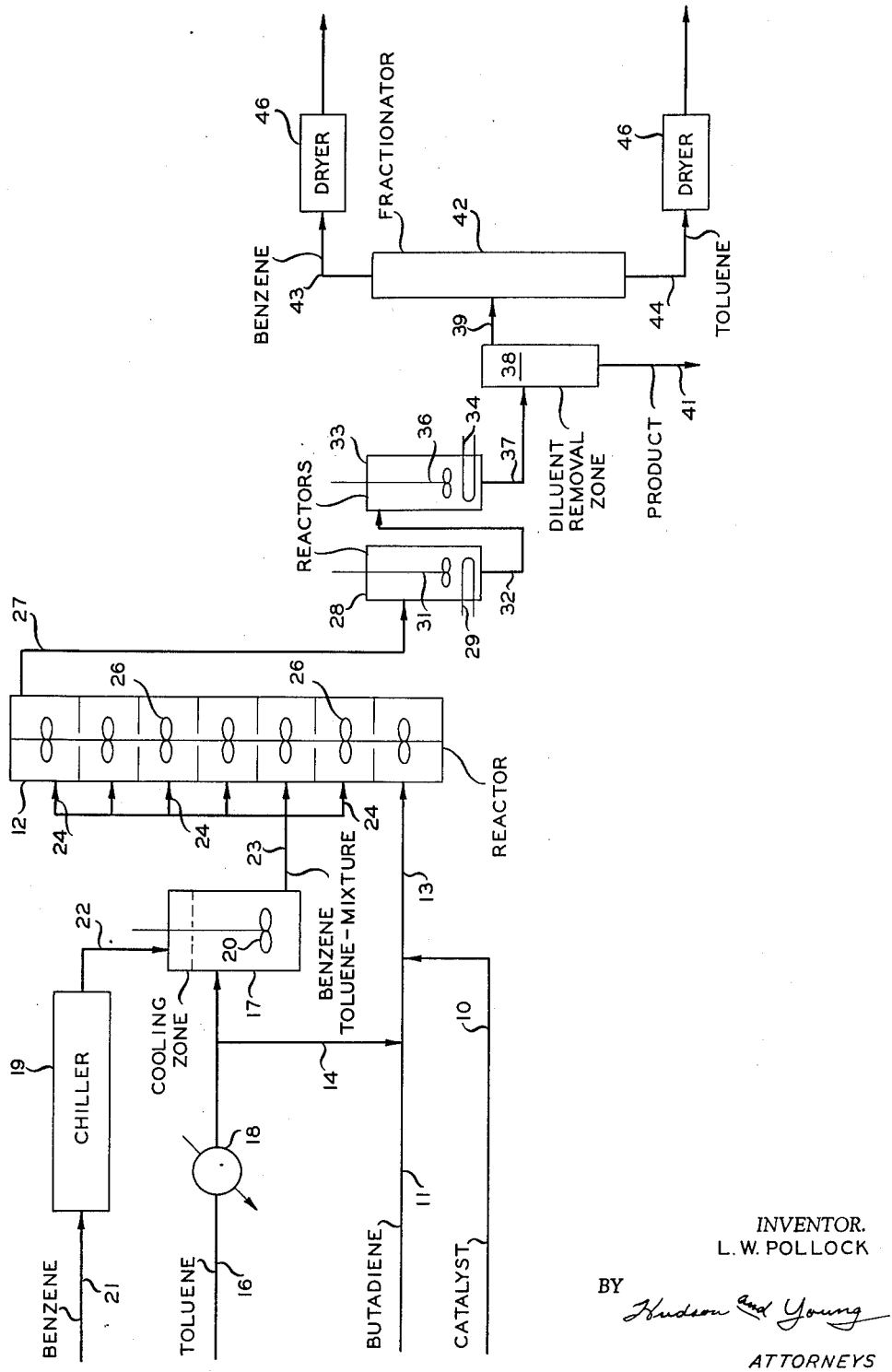

3,057,840
METHOD FOR CONTROLLING THE TEMPERATURE IN A BUTADIENE POLYMERIZATION PROCESS
Lyle W. Pollock, Bartlesville, Okla., assignor to Phillips Petroleum Company, a corporation of Delaware
Filed Feb. 23, 1960, Ser. No. 10,360
7 Claims. (Cl. 260—94.3)

This invention relates to the polymerization of 1,3-butadiene. In one aspect, it relates to a process in which 1,3-butadiene is polymerized to a polybutadiene containing a high percentage of cis 1,4-addition. In another aspect, it relates to a multi-stage process for polymerizing 1,3-butadiene, which renders it possible to maintain close control over the reaction temperature.

Various methods are described in the literature for polymerizing 1,3-butadiene, including emulsion polymerization, alkali metal-catalyzed polymerization, and alfin-catalyzed polymerization. Emulsion polymerization of 1,3-butadiene gives a polymer with from about 60 to about 80 percent trans 1,4-addition, from about 5 to about 20 percent cis 1,4-addition, and from about 15 to about 20 percent 1,2-addition. Sodium-catalyzed polybutadiene has from about 60 to about 75 percent 1,2-addition, the remainder being cis and trans 1,4-addition. When potassium and other alkali metals are employed as catalysts, the latter ratios may vary to some degree. Alfin-catalyzed polybutadiene has from about 65 to about 75 percent trans 1,4-addition, from about 5 to about 10 percent cis 1,4-addition and from about 20 to about 25 percent 1,2-addition. Until quite recently no polymers of butadiene have been produced which contain more than about 35 percent cis 1,4-configuration. However, in the copending U.S. application of D. R. Smith and R. P. Zelinski, Serial No. 578,166, filed on April 16, 1956, and in the copending U.S. patent application of F. E. Naylor, Serial No. 722,842, filed on March 21, 1958, now Patent No. 3,004,018, processes are disclosed for producing polybutadiene in which a very high percentage fo the polymer, e.g., from 90 to 98 percent, is formed by cis 1,4-addition of the butadiene. The instant invention is concerned with an improvement in the processes disclosed in the aforementioned patent applications.

It is an object of this invention to provide a novel process for producing a rubbery polymer of 1,3-butadiene.

Another object of the invention is to provide a process for polymerizing butadiene in which provision is made for maintaining close control over the reaction temperature.

A further object of the invention is to provide a multi-stage process for polymerizing butadiene in which close control is maintained over the polymerization temperature.

A still further object of the invention is to provide a novel method for controlling the temperature in a butadiene polymerization process.

Still another object of the invention is to provide a novel reactor system for use in polymerization processes.

Other and further objects and advantages of the invention will become apparent to those skilled in the art upon consideration of the accompanying disclosure.

It has recently been discovered, as disclosed in the aforementioned patent applications of Smith and Zelinski and Naylor, that a polybutadiene of high cis 1,4-configuration can be obtained by polymerizing butadiene in the presence of a catalyst system comprising an organo compound, such as a trialkylaluminum, and titanium tetraiodide. The processes described in the applications are usually conducted at a temperature in the range of zero to 150° C. although lower temperatures can be employed. The reaction rate for the solution polymerization of butadiene to a cis 1,4-polybutadiene rubber has been found to approach that of a second order reaction. In other words, the reaction rate decreases rapidly as the polymerization proceeds. In order to obtain a high percentage of cis-linkages in the polymer, it has been found to be advantageous to carry out the polymerization at a relatively low temperature, e.g., at a temperature in the range of —25 to 30° F., preferably at about 0 to 20° F. During the initial part of the polymerization, the reaction proceeds quite rapidly. According to the present invention special provision is made for removing the large amount of heat which is initiated during the initial stages of the reaction.

The instant invention resides in an improvement in a process for polymerizing 1,3-butadiene in the presence of a catalyst comprising (a) a compound corresponding to the formula $R_nM$, wherein R is an alkyl radical, preferably containing up to and including 12 carbon atoms, M is a metal selected from the group consisting of aluminum, gallium, indium, mercury and zinc, and n is an integar equal to the valence of the metal M, and (b) titanium tetraiodide. Broadly speaking, the improvement comprises the steps of introducing the aforementioned catalyst and 1,3-butadiene into a first polymerization zone, contacting a liquid hydrocarbon diluent in a cooling zone with a solid, frozen hydrocarbon, the latter hydrocarbon having a freezing point higher than that of the liquid hydrocarbon diluent, thereby reducing the temperature of the resulting mixture of hydrocarbons in the cooling zone to below the temperature to be maintained in the first polymerization zone, passing the cooled mixture of hydrocarbons into the first polymerization zone at a rate such as to maintain a temperature therein in the range of —25 to 30° F., withdrawing an effluent stream containing hydrocarbon mixture, polymer, butadiene and catalyst from the first polymerization zone at a rate such that from 10 to 40 weight percent of the butadiene is converted to polymer in the first polymerization zone, passing the effluent stream into a second polymerization zone, cooling the materials in the second polymerization zone to a temperature in the range of —25 to 30° F., and recovering an effluent stream containing hydrocarbon mixture, polymer, butadiene and catalyst from the second polymerization zone.

In a preferred embodiment of the invention, toluene is used as the liquid hydrocarbon diluent and benzene is employed as the solid, frozen hydrocarbon. And although the invention is described hereinafter with relation to these specific materials, it is within the scope of the invention to use any suitable hydrocarbons. Thus, paraffinic, cycloparaffinic and aromatic hydrocarbons, which are substantially inert under the polymerization conditions can be used. It is important, however, that there be a considerable difference, e.g., in the range of 80 to 300° F., between the freezing points of the two hydrocarbons. The hydrocarbon selected for use as the liquid hydrocarbon diluent has a low freezing point temperature, e.g., in the range of —50 to —225° F. Examples of suitable, low freeze point materials include n-hexane, n-heptane, methylcyclohexane, ethyl benzene, and toluene, having freeze points, respectively, of —139° F., —131° F., —190° F., —139° F., and —138° F. The hydrocarbon which is frozen during the practice of the present process has a substantially higher freezing point temperature than that of the liquid hydrocarbon diluent, e.g., in the range of 30 to 75° F. Examples of suitable hydrocarbons having such higher freezing points include tetradecane (43° F.), pentadecane (50° F.), hexadecane (65° F.), heptadecane (70° F.), octadecane (82° F.), cyclohexane (42.5° F.), benzene (43° F.), and paraxylene (55.9° F.), the freezing point of each compound being as indicated.

A more complete understanding of the invention can be obtained by referring to the drawing which is a flow diagram illustrating a preferred embodiment of the invention. Various items of conventional equipment, such as pumps and flow control valves, are not shown in the drawing, but their utilization is well within the skill of the art.

As shown in the drawing, catalyst and butadiene are charged to the system through lines 10 and 11. Before introduction of these materials into reactor 12 through line 13, they are mixed with toluene which is supplied to line 11 through line 14. As mentined hereinbefore, the catalyst used in the process comprises an organometal compound of the formula $R_nM$, wherein R is an alkyl radical and M is aluminum, gallium, indium, mercury or zinc, and titanium tetraiodide. It is also within the scope of the invention to use a catalyst in which a portion of the titanium tetraiodide is replaced by titanium tetrachloride. The alkyl group can be either straight or branched chain alkyls, for example, methyl, ethyl, propyl, isopropyl, n-butyl, isobutyl, pentyl, isohexyl, n-hexyl, n-heptyl, n-octyl, or tert-dodecyl. It is to be understood that the alkyl groups in the aforementioned general formula can be the same or they can be different. For example, it is within the purview of the invention to employ an organometal compound such as diisobutylmonoethylaluminum or isobutylethylzinc in the catalyst system of the present invention. Examples of other suitable organometal compounds include trimethylaluminum, triethylaluminum, triisobutylaluminum, tri-n-pentylaluminum, tri-n-hexylaluminum, tri-n-octylaluminum, diisobutylmercury, diethylmercury, di-n-decylmercury, diethylzinc, di-n-butylzinc, di-n-octylzinc, di-n-undecylzinc, di-n-dodecylzinc, triisobutylindium, tri-n-pentylindium, tri-n-butylgallium, tri-n-octylgallium, and the like. It is also within the scope of the invention to utilize mixtures of the organometal compounds in the catalyst system. It is, of course, realized that minor amounts of other materials which have no catalytic effect may be included in the system without departing from the spirit or scope of the invention.

The amount of the organometal compound used in the catalyst composition is usually in the range of 1.0 to 15 mols per mol of titanium tetraiodide. However, a preferred mol ratio is from 2.5:1 to 8:1 of the organometal compound to the titanium tetraiodide. The concentration of the total catalyst composition, i.e., organometal compound and titanium tetraiodide, is usually in the range of 0.05 to 10 weight percent, preferably in the range of 0.05 to 5 weight percent, based on the total amount of 1,3-butadiene charged to the polymerization zone.

The diluent toluene, which enters the system through line 16, is thereafter passed into cooling zone 17. Before enterinng the cooling zone, the toluene is flowed through a cooler 18 wherein it is cooled to a temperature below room temperature, e.g., to a temperature between 30 and 50° F. In cooling zone 17, the toluene is cooled to a desired temperature below the polymerization temperature to be maintained in reactor 12. This cooling of the toluene is accomplished by mixing it with a solid, frozen hydrocarbon, which has a freezing point higher than that of toluene. The solid hydrocarbon, e.g. benzene, is formed by passing liquid benzene into a refrigeration means 19 through line 21. The refrigeration means can be a scraped surface chiller or any other similar means for cooling the benzene to below its freezing point. The frozen benzene formed in chiller 19 is withdrawn therefrom through line 22 and then passed into cooling zone 17. The frozen benzene melts in the cooling zone, annd the heat required for this endothermic phase change, commonly referred to as the heat of fusion, results in the lowering of the temperature of the diluent mixture in the cooling zone. The cooling zone is provided with a stirrer 20 which ensures that the toluene and benzene are adequately mixed. Sufficient of the solid benzene is supplied to the cooling zone as will result in the temperature of the diluent mixture being below the temperature to be maintained in polymerization zone 12. The temperature of the diluent mixture in the cooling zone can vary over a wide range, e.g., −100° F. to 10° F., and the particular temperature will depend upon the temperature to be maintained in polymerization zone 12. As mentioned hereinbefore, the temperature in polymerization zone 12 is preferably maintained in the range of −25 to 30° F. The amount of frozen benzene or other suitable hydrocarbon required to be supplied to cooling zone 12 in order to provide a diluent mixture of the desired temperature can be readily determined by one skilled in the art.

The cooled diluent mixture is introduced into reactor 12 by means of line 23. As shown in the drawing, the reactor is preferably an elongated, substantially cylindrical vessel. The cooled diluent mixture is desirably introduced into this reactor through a plurality of vertically spaced inlet lines 24. This type of introduction ensures that the cooled diluent is evenly distributed throughout the reaction zone. The reactor is provided with a plurality of stirrers 26 which facilitates good contact between the catalyst and butadiene. The pressure in reactor 12 will normally be the vapor pressure of the reaction mixture at the polymerization temperature, no outside source of pressure being necessary. However, higher pressures can be employed, if desired, these pressures being obtained by some such suitable means as the pressurization of the reactor with a gas which is inert with respect to the polymerization reaction.

It has been previously mentioned that the reaction rate in the instant polymerization process decreases rapidly as the polymerization proceeds. It is during the first part of the reaction, e.g., up to 40 percent conversion of the butadiene, that difficulty has been encountered in controlling the temperature of the polymerization reaction. In the conduct of polymerization reactions, it is the usual practice to provide indirect cooling means to effect the removal of the exothermic heat of reaction. However, the capacity of such systems for heat removal is limited, and they have not, therefore, been entirely satisfactory for use in the polymerization of butadiene with the instant catalyst system. According to the present invention, the polymerization is carried out in at least two stages, and a diluent mixture cooled to below the desired polymerization temperature is employed in the first stage to effect the desired removal of the heat of reaction. This direct method of controlling the temperature in the first polymerization zone wherein a large percentage of the heat of reaction is liberated is not dependent, as in indirect cooling methods, upon the heat transfer coefficients through shells and tubes which tend to vary and make temperature control difficult. Merely by controlling the amount and the temperature of the diluent mixture introduced into reactor 12 through line 23 and the rate at which effluent is withdrawn therefrom through line 27, it is possible to maintain close control over the temperature to be maintained in the reactor.

An effluent stream containing diluent mixture, polymer, unreacted butadiene and catalyst is withdrawn from reactor 12 through line 27. The rate at which the effluent is withdrawn from the reactor is dependent at least in part upon the degree of conversion it is desired to effect in the reactor. It is usually desired to convert about 10 to 40 weight percent of the butadiene to polymer in the first reactor since it is during this portion of the reaction that a large part of the heat of reaction is liberated. The effluent stream from reactor 12 is thereafter passed into reactor 28 wherein the polymerization is allowed to continue. It is to be noted that reactor 28 is provided with an indirect heat exchange means 29 through which a suitable coolant is circulated so as to maintain a desired polymerization temperature in the reactor. An indirect heat exchange means can be satisfactorily used in the second stage reactor since a large part of the heat of reaction has previously been removed in the first stage reactor, i.e., reactor 12. A suitable coolant, such as a brine solution or a cooled hydrocarbon, is flowed through heat exchange means 29 at a temperature and rate sufficient to maintain a temperature in reactor 28 in the range of −25 to 30° F. Reactor 28 is also provided with a stirring means 31 in order to maintain good contact between the butadiene and the catalyst. In the usual operation, conduct of the polymerization in two stages is quite satisfactory. When operating in two stages with two reactors, it is preferred to obtain an overall conversion of about 50 to 80 weight percent of the butadiene to polymer with about 10 to 40 percent being converted in the first reactor.

It is, however, within the scope of the invention to use more than two reactors, and the system illustrated in the drawing actually utilizes three reactors. When employing a three stage process with three reactors, an effluent stream containing diluent mixture, polymer, unreacted butadiene and catalyst is recovered from the second reactor, i.e., reactor 28, through line 32 and thereafter passed into reactor 33. Reactor 33 is operated similarly to reactor 28, being also provided with an indirect heat exchange means 34 and a stirrer 36. The temperature in reactor 33 is also maintained in the range of −25 to 30° F. by circulating a suitable coolant through indirect heat exchange means 34. In a preferred method of operating with three reactors, substantially equal amounts of butadiene are converted to polymer in each reactor.

The effluent stream recovered from reactor 33 through line 37 is then passed into diluent removal zone 38. A steam stripper can advantageously be employed in order to separate diluent from the product polybutadiene. The diluent mixture is recovered from zone 38 through line 39 while the product is withdrawn from the same zone through line 41. Thereafter, the diluent mixture is passed into fractionation zone 42 wherein the toluene and benzene are separated. Benzene is taken overhead from fractionator 42 through line 43 while toluene is recovered therefrom through line 44. The benzene and the toluene are thereafter passed into and through driers 46 prior to their passage to storage or reuse in the process. After its recovery through line 41, the polybutadiene can be treated to remove catalyst residues and dried.

A more comprehensive understanding of the invention can be obtained by referring to the following illustrative example which is not intended, however, to be unduly limitative of the invention.

EXAMPLE

A run is carried out in which a cis 1,4-polybutadiene is prepared by polymerizing 1,3-butadiene with a catalyst consisting of triisobutylaluminum (TIBA), titanium tetraiodide (TiI$_4$) and titanium tetrachloride (TiCl$_4$). A system similar to that shown in the drawing but using two reactors is employed in carrying out the polymerization.

The 1,3-butadiene and catalyst are charged in toluene to the first stage reaction. The diluent toluene is initially cooled to 40° F. and thereafter passed into the cooling zone. Benzene is charged to a scraped surface chiller wherein it is cooled to 43° F. Cooling is continued until 80 percent of the benzene is frozen. After removal from the scraped surface chiller, the benzene is passed into the cooling zone. The toluene and benzene are intimately mixed in the cooling zone. The frozen benzene melts with the result that heat is absorbed in an amount corresponding to the heat of fusion of benzene (54.2 B.t.u./lb.). The temperature of the toluene-benzene mixture is thereby lowered to −25° F. This mixture is then supplied to the first stage reactor wherein it serves as the reaction medium. The diluent mixture is introduced into the reactor at a rate such as to maintain a temperature of 20° F. in the reactor. This control is accomplished by positioning in the reactor a temperature sensing element which provides a signal for operating a flow control valve in the diluent inlet line. The effluent stream recovered from the first stage reactor contains toluene-benzene mixture, polymer, unreacted butadiene and catalyst. The rate of withdrawal of the effluent stream is controlled so that about 30 weight percent of the butadiene is converted to polymer in the first reactor. The effluent stream from the first reactor is passed into the second stage reactor wherein the reaction is continued until a total conversion of about 60 percent is obtained. The temperature in the second stage reactor is also maintained at about 20° F. The pressure in both reactors is equal to the vapor pressure of the reaction mixtures at the polymerization temperature. An effluent stream containing diluent mixture, polymer, unreacted butadiene and catalyst is withdrawn from the second reactor. The effluent from the polymerization zone is passed to a series of flash vessels (not shown in the drawing) from which unreacted butadiene is recovered as an overhead stream and returned to the reactors. The bottoms from the flash vessels is then passed into a steam stripper. An overhead stream containing diluent mixture and a bottoms stream containing the cis 1,4-polybutadiene product are recovered from the steam stripper. The overhead stream from the steam stripper is charged to a fractionation zone from which toluene and benzene are separately recovered. After being dried, the toluene and benzene are passed into storage tanks prior to being reused in the process.

Data for the above-described run are shown hereinbelow in the table.

Table

| | |
|---|---|
| Butadiene feed rate, lbs./hr | 10,000 |
| Benzene feed rate, lbs./hr | 60,000 |
| Toluene feed rate, lbs./hr | 60,000 |
| Catalyst mol ratio (TIBA/TiCl$_4$/TiI$_4$) | 5:1:1 |
| Catalyst concentration (parts catalyst/100 parts butadiene): | |
|   First stage reactor | 0.2–0.5 |
|   Second stage reactor | 0.2–0.5 |
| Temperature, °F.: | |
|   Benzene at chiller outlet | 43 |
|   Toluene at cooling zone inlet | 40 |
|   Toluene-benzene mixture at cooling zone outlet | −25 |
|   Reaction mixture, 1st reactor | 20 |
|   Reaction mixture, 2nd reactor | 20 |
| Conversion, percent: | |
|   First reactor | 30 |
|   Second reactor | 30 |
|     Total | 60 |
| Production rate, lbs. polymer/hr | 6,000 |

The above example illustrates that the present invention provides a novel and effective method for controlling the temperature in a butadiene polymerization process.

It is also seen from the foregoing that according to the present invention there is provided a polymerization reaction system from which part of the heat of reaction is removed by benzene at a relatively high temperature while at the same time permitting control of reaction temperature at a substantially lower value. By using the diluent mixture as the cooling medium, a savings in the cost of refrigeration is obtained as compared to the cost of refrigerating a single diluent to the low temperature required to remove the heat of polymerization by conventional means.

Although the use of substantially pure benzene has been described, it is to be understood that benzene or other hydrocarbon containing a small percentage of impurity can be employed. For example, referring to the drawing, the benzene obtained as an overhead product from fractionator 42 through line 43 can be substantially pure benzene, or it can contain toluene in an amount not exceeding about 10 percent by weight, depending upon the efficiency of operation of the fractionator. If this stream is reused in chiller 19, the temperature at which the chiller is operated will be determined by (1) the amount of impurity in the benzene and (2) the desired proportion of solid benzene in the chiller outlet. Since an increase in either of these variables results in a lower chiller temperature (except when pure benzene is used), the concentration of impurity which can be permitted without losing the advantage of relatively high temperature level refrigeration is limited. As indicated above, this advantage of the invention is retained even though the benzene or other hydrocarbon contains an amount of impurity not exceeding about 10 percent by weight.

The polymers produced by the process of this invention have utility in applications where natural and synthetic rubbers are used. They can be used in the manufacture of automobile tires as well as in the fabrication of other rubber articles.

As will be evident to those skilled in the art, many variations and modifications can be practiced which fall within the scope of the disclosure of this invention.

I claim:

1. In a process for polymerizing 1,3-butadiene in the presence of a catalyst comprising (a) a compound of the formula $R_nM$, wherein R is an alkyl radical, M is a metal selected from the group consisting of aluminum, gallium, indium, mercury and zinc and $n$ is an integer equal to the valence of the metal M, and (b) titanium tetraiodide, the improvement which comprises the steps of introducing said catalyst and said 1,3-butadiene into a first polymerization zone; contacting a liquid hydrocarbon diluent having a freezing point in the range of about −50 to about −225° F. in a cooling zone with a frozen hydrocarbon, said frozen hydrocarbon having a freezing point higher than that of said liquid hydrocarbon diluent and in the range of about 30 to about 75° F., thereby reducing the temperature of the resulting mixture of hydrocarbons in said cooling zone to a temperature below the temperature to be maintained in said first polymerization zone and below the freezing point of said frozen hydrocarbon; passing said mixture of hydrocarbons from said cooling zone into said polymerization zone at a rate such as to maintain therein a temperature in the range of −25 to 30° F.; withdrawing an effluent stream containing hydrocarbon mixture, polymer, butadiene and catalyst from said first polymerization zone at a rate such that from 10 to 40 weight percent of said butadiene introduced into said zone is converted to polymer, passing said effluent stream into a second polymerization zone; maintaining the temperature in said second polymerization zone at a temperature in the range of −25 to 30° F.; and recovering an effluent stream containing hydrocarbon mixture, polymer, butadiene and catalyst from said second polymerization zone.

2. The process according to claim 2 in which said liquid hydrocarbon diluent is toluene and said frozen hydrocarbon is benzene.

3. The process according to claim 2 in which said liquid hydrocarbon diluent is ethyl benzene and said frozen hydrocarbon is paraxylene.

4. The process according to claim 2 in which said liquid hydrocarbon diluent is methylcyclohexane and said frozen hydrocarbon is cyclohexane.

5. In a process for polymerizing 1,3-butadiene in the presence of a catalyst comprising (a) a compound of the formula $R_nM$ wherein R is an alkyl radical, M is a metal selected from the group consisting of aluminum, gallium, indium, mercury and zinc and $n$ is an integer equal to the valence of the metal M, and (b) titanium tetraiodide, the improvement which comprises the steps of introducing said catalyst and said 1,3-butadiene into a first polymerization zone; introducing toluene at a temperature in the range of 30 to 50° F. into a cooling zone; cooling benzene to a temperature below that at which benzene freezes; introducing the resulting frozen benzene into said cooling zone; mixing said toluene and said frozen benzene in said cooling zone wherein said benzene undergoes an endothermic phase change, thereby lowering the temperature of the resulting diluent mixture to a temperature in the range of −100 to 10° F.; passing said diluent mixture of toluene and benzene from said cooling zone into said first polymerization zone at a rate such as to maintain therein a temperature in the range of −25 to 30° F.; withdrawing an effluent stream containing diluent mixture, polymer, butadiene and catalyst from said first polymerization zone at a rate such that from 10 to 40 weight percent of said butadiene introduced into said zone is converted to polymer, passing said effluent stream into a second polymerization zone; maintaining the temperature in said second polymerization zone at a temperature in the range of −25 to 30° F.; and recovering an effluent stream containing diluent mixture, polymer, butadiene and catalyst from said second polymerization zone.

6. The process according to claim 5 wherein said effluent stream recovered from said polymerization zone is introduced into a steam stripping zone; a polybutadiene product is recovered from the bottom of said steam stripping zone; a stream containing said diluent mixture of toluene and benzene is recovered from the top of said steam stripping zone; said latter stream is introduced into a fractionation zone; and benzene and toluene are separately recovered from said fractionation zone.

7. In a process for polymerizing 1,3-butadiene in the presence of a catalyst, the improvement which comprises the steps of introducing said catalyst and said 1,3-butadiene into a polymerization zone; contacting a liquid hydrocarbon diluent having a freezing point in the range of about −50 to about −225° F. in a cooling zone with a frozen hydrocarbon, said frozen hydrocarbon having a freezing point higher than that of said liquid hydrocarbon diluent and in the range of about 30 to about 75° F., thereby reducing the temperature of the resulting mixture of hydrocarbons in said cooling zone to a temperature below the temperature to be maintained in said polymerization zone and below the freezing point of said frozen hydrocarbon; passing said mixture of hydrocarbons from said cooling zone into said polymerization zone at a rate such as to maintain therein a temperature in the range of −25 to 30° F.; and withdrawing an effluent stream containing hydrocarbon mixture, polymer, butadiene and catalyst from said polymerization zone.

References Cited in the file of this patent

UNITED STATES PATENTS

| 2,007,510 | Thornton | Nov. 30, 1931 |
| 2,356,128 | Thomas | Aug. 22, 1944 |
| 2,846,421 | Pollock | Aug. 5, 1958 |
| 2,953,556 | Wolfe | Sept. 20, 1960 |
| 2,979,488 | Carpenter | Apr. 11, 1961 |

FOREIGN PATENTS

| 551,851 | Belgium | Apr. 17, 1957 |

UNITED STATES PATENT OFFICE
CERTIFICATE OF CORRECTION

Patent No. 3,057,840 October 9, 1962

Lyle W. Pollock

It is hereby certified that error appears in the above numbered patent requiring correction and that the said Letters Patent should read as corrected below.

Column 7, lines 51, 54, and 57, for the claim reference numeral "2", each occurrence, read -- 1 --.

Signed and sealed this 16th day of April 1963.

(SEAL)
Attest:

ERNEST W. SWIDER
Attesting Officer

DAVID L. LADD
Commissioner of Patents